US010393620B2

(12) United States Patent
Forrest et al.

(10) Patent No.: US 10,393,620 B2
(45) Date of Patent: Aug. 27, 2019

(54) METHOD OF CONFIGURING AN OPTICAL CABLE AND APPARATUS FOR SAME (71) Applicant: Iruvis Ltd., Abindgon, Oxon (GB)

(72) Inventors: Laurence Frederick Forrest, Abingdon (GB); Michael Robert Osborne, Frilford Heath (GB)

(73) Assignee: Iruvis Ltd., Abingdon, Oxon (GB)

( * ) Notice: Subject to any disclaimer, the term of this patent is extended or adjusted under 35 U.S.C. 154(b) by 5 days.

(21) Appl. No.: 15/728,231

(22) Filed: Oct. 9, 2017

(65) Prior Publication Data
US 2019/0107462 A1 Apr. 11, 2019

(51) Int. Cl.
*G01M 11/00* (2006.01)
*G02B 6/42* (2006.01)
*G02B 6/25* (2006.01)

(52) U.S. Cl.
CPC ............... *G01M 11/33* (2013.01); *G02B 6/25* (2013.01); *G02B 6/4228* (2013.01); *G02B 6/4298* (2013.01)

(58) Field of Classification Search
CPC ....... G01M 11/33; G02N 6/25; G02N 6/4228; G02N 6/4298
See application file for complete search history.

(56) References Cited

U.S. PATENT DOCUMENTS

| 5,926,586 A | * | 7/1999 | Dragone | .................. G02B 6/12 385/129 |
| 2004/0047587 A1 | * | 3/2004 | Osborne | ............. B23K 26/0734 385/147 |
| 2009/0297099 A1 | * | 12/2009 | Benjamin | ................. G02B 6/25 385/32 |
| 2010/0303419 A1 | * | 12/2010 | Benjamin | .......... G02B 6/02342 385/72 |
| 2011/0013905 A1 | * | 1/2011 | Wang | ...................... G01M 11/33 398/21 |
| 2017/0285266 A1 | * | 10/2017 | Wu | ......................... B23K 26/53 |

FOREIGN PATENT DOCUMENTS

WO 2002034452 A1 5/2002

* cited by examiner

*Primary Examiner* — Dominic J Bologna
(74) *Attorney, Agent, or Firm* — Downs Rachlin Martin PLLC (57) ABSTRACT

A method of configuring an optical cable comprising a plurality of optical fibers. The method includes cleaving with a laser beam a first end of an optical fiber at a first end of the optical cable. The laser beam has an intensity distribution adapted to cause a burst of light to be generated during cleaving of the optical fiber and the laser beam is adapted to cause at least some of the burst of light to be received into the first end of the optical fiber, for propagation within the optical fiber. Light output from a second end of the optical cable is detected, and the optical fiber from which the light was output is determined. Finally, the optical fiber at the second end of the optical cable from which the light was output is correlated with the optical fiber that was cleaved.

12 Claims, 9 Drawing Sheets

METHOD OF CONFIGURING AN OPTICAL CABLE AND APPARATUS FOR SAME

FIELD OF THE INVENTION

The present invention relates to a method of configuring an optical cable comprising a plurality of optical fibers and to an apparatus for implementing the method.

BACKGROUND

There is an increasing use of multi-fiber optical cables and connectors. Ribbon cables have been widely used, since they offer a convenient means of matching the sequence of optical fibers at each end of the optical cable. However, there is a trend towards the more flexible geometry of round cables, in which case having single optical fibers within the optical cable is more convenient. This gives rise to a requirement to sequence the optical fibers at each end of the optical cable. Traditionally, colour-coding of the fibers is employed, but this still leaves the possibility of error and when there are large numbers of fibers it can be difficult to specify a correspondingly large number of different, recognizable colors.

SUMMARY OF THE DISCLOSURE

It is an object of the invention to provide an improved method of configuring an optical cable comprising a plurality of optical fibers. It is a further object of the invention to provide an improved apparatus for configuring an optical cable comprising a plurality of optical fibers.

In one aspect, the invention provides a method of configuring an optical cable comprising a plurality of optical fibers. The method comprises cleaving with a laser beam a first end an optical fiber of the plurality of optical fibers at a first end of the optical cable. The laser beam has an intensity distribution adapted and arranged to cause a burst of light to be generated during cleaving of the optical fiber. The laser beam is adapted and arranged to cause at least some of the burst of light to be received into the first end of the optical fiber, for propagation within the optical fiber. Light which propagates through the optical fiber and is output from a second end of the optical cable, distal from the first end, is detected. It is then determined which of the plurality of optical fibers at the second end of the optical cable the light was output from. The optical fiber at the second end of the optical cable from which the light was output is then identified as corresponding to the optical fiber that was cleaved with the laser beam at the first end of the optical cable.

The method may be used both to identify and match the two ends of an optical fiber within an optical cable and to check the continuity of the optical fiber within the optical cable.

In an embodiment, the steps of the method are performed for each optical fiber of the plurality of optical fibers. The method may be used both to identify and match the two ends of each optical fiber within an optical cable and to check the continuity of each optical fiber within the optical cable.

In an embodiment, each of the plurality of optical fibers has a first end and a second end. The first ends of the plurality of optical fibers are arranged in a sequence at the first end of the optical cable. The method further comprises arranging the second ends of the plurality of optical fibers in said sequence at the second end of the optical cable depending on said identifying of the optical fiber at the second end of the optical cable. The method may therefore be used to ensure that the optical fibers within the optical cable are arranged in the same sequence at each end. In an embodiment, the first ends of the plurality of optical fibers are in one of a preselected sequence and an arbitrary sequence, which may be a random sequence.

In an embodiment, unique identifiers are allocated to the plurality of optical fibers at the first end of the optical cable. The method further comprises, following the step of identifying the optical fiber, allocating to the optical fiber at the second end of the optical cable, from which the light was output, the unique identifier of the optical fiber that was cleaved with the laser beam at the first end of the optical cable. The method may therefore be used to ensure that the optical fibers within the optical cable are uniquely identifiable at each end of the optical cable.

In an embodiment, the unique identifiers are allocated to the optical fibers by applying an indicia, such as a number or a colour, to the respective optical fiber or to a mounting apparatus, such as a ferrule or v-groove, in which the optical fiber is located.

In an embodiment, the first ends of the plurality of optical fibers are located in respective locations at the first end of the optical cable, a second end of each optical fiber at the second end of the optical cable is then determined, and the second end of each optical fiber is located in a corresponding respective location at the second end of the optical cable. The method further comprises, following said step of identifying the optical fiber: confirming that the optical fiber at the second end of the optical cable from which the light was output has the same respective location as the optical fiber that was cleaved with the laser beam at the first end of the optical cable; or moving the second end of the optical cable from which the light was output to said corresponding respective location at the second end of the optical cable if the second end of the optical fiber from which the light was output does not have the same respective location as the optical fiber that was cleaved with the laser beam at the first end of the optical cable.

The method may therefore be applied to confirm the correct location of the optical fibers at the second end of the optical cable, and to correct the location of an optical fiber at the second end of the optical cable if the manual determination or location of the second end of the optical fiber was incorrectly performed.

In an embodiment, the first ends of the plurality of optical fibers are in a first sequence at the first end of the optical cable and the second ends of the plurality of optical fibers are in a second sequence at the second end of the optical cable. The method comprises determining a first end sequence location to second end sequence location mapping relationship and storing said relationship for the optical fiber depending on said identifying of the optical fiber at the second end of the optical cable. An optical cable can therefore be configured with a mapping between the optical fibers at the first end and the second end, without requiring the optical fibers to be arranged in the same sequence at each end of the optical cable. Each of the first sequence and the second sequence may be an arbitrary sequence.

Corresponding embodiments apply to the apparatus described below.

A further aspect of the invention provides apparatus adapted and arranged to carry out the above described method of configuring an optical cable comprising a plurality of optical fibers.

A further aspect of the invention provides optical cable configuration apparatus comprising optical fiber locating apparatus, an optical source and optical detection apparatus. The optical fiber locating apparatus is configured to hold first ends of a plurality of optical fibers of the optical cable at a first end of the optical cable. The optical source is configured to generate a laser beam for laser cleaving a first end of an optical fiber of the plurality of optical fibers. The laser beam has an intensity distribution adapted and arranged to cause a burst of light to be generated during the laser cleaving of the optical fiber. The laser beam is adapted and arranged to cause at least some of the burst of light to be received into the first end of the optical fiber, for propagation within the optical fiber. The optical detection apparatus is configured to: detect light output from a second end of the optical cable, distal from the first end; and to determine which of the plurality of optical fibers at the second end of the optical cable the light was output from.

The apparatus may enable both identification and matching of the two ends of an optical fiber within an optical cable and to check the continuity of the optical fiber within the optical cable.

In an embodiment, the optical detection apparatus comprises an optical array detector and signal processing apparatus. The optical array detector is configured to detect light output from the second end of the optical cable. The signal processing apparatus is configured to receive an output signal from the optical detector array and is configured to determine which of the plurality of optical fibers the light was output from.

In an embodiment, the apparatus additionally comprises second fiber locating apparatus configured to hold second ends of the plurality of optical fibers of the optical cable at the second end of the optical cable. The optical detection apparatus comprises a plurality of optical detectors configured to detect light output from respective optical fibers of the plurality of optical fibers at the second end of the optical cable.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

The same reference numbers are retained for corresponding features in the various embodiments described herein.

Figure 1:
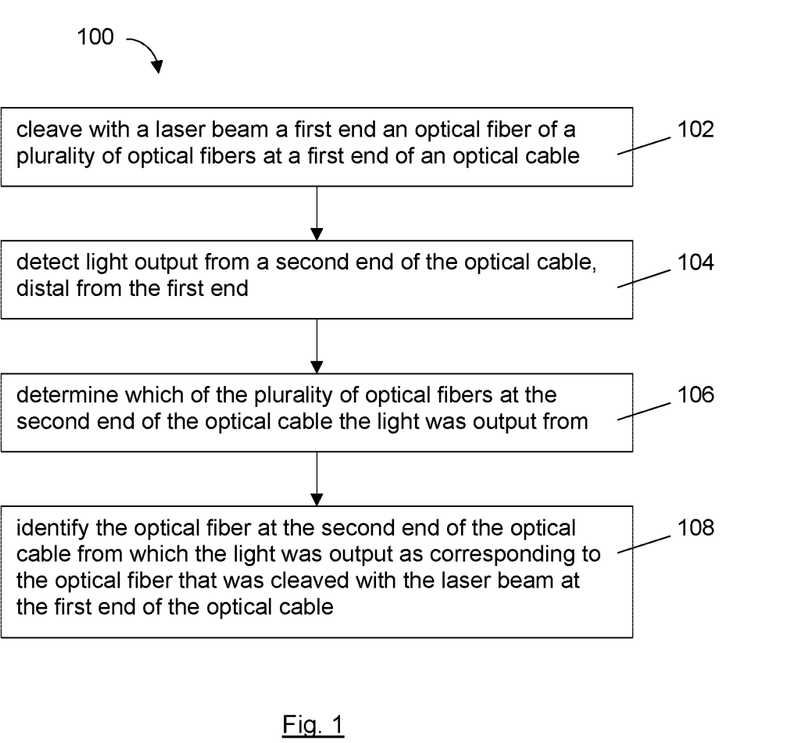
FIGS. 1 to 6 illustrate steps of methods according to embodiments of the invention of configuring an optical cable.

FIG. 1 illustrates an embodiment of a method 100 of configuring an optical cable comprising a plurality of optical fibers, each optical fiber having a first end and a second end. The method 100 comprises cleaving 102 a first end an optical fiber of the plurality of optical fibers at a first end of the optical cable. Said first end of the optical fiber is cleaved with a laser beam having an intensity distribution adapted and arranged to cause a burst of light to be generated during the cleaving of the optical fiber. The laser beam is adapted and arranged to cause at least some of the burst of light to be received into the first end of the optical fiber, for propagation within the optical fiber.

The method additionally comprises detecting 104 light output from a second end of the optical cable, distal from the first end. The method then comprises determining 106 which of the plurality of optical fibers at the second end of the optical cable the light was output from. The optical fiber at the second end of the optical cable from which the light was output is then identified 108 as corresponding to the optical fiber that was cleaved with the laser beam at the first end of the optical cable.

The light output from the second end of the optical cable is at least some of said burst of light generated during the cleaving of the optical fiber at the first end of the optical cable, which has propagated within the optical fiber to a second end of the optical fiber at the second end of the optical cable. The method may therefore enable the corresponding optical fiber to be identified at the second, distal end of an optical cable during cleaving of the optical fiber at the first end. The method may also enable the continuity of the optical fiber within the optical cable to be checked.

Figure 2:
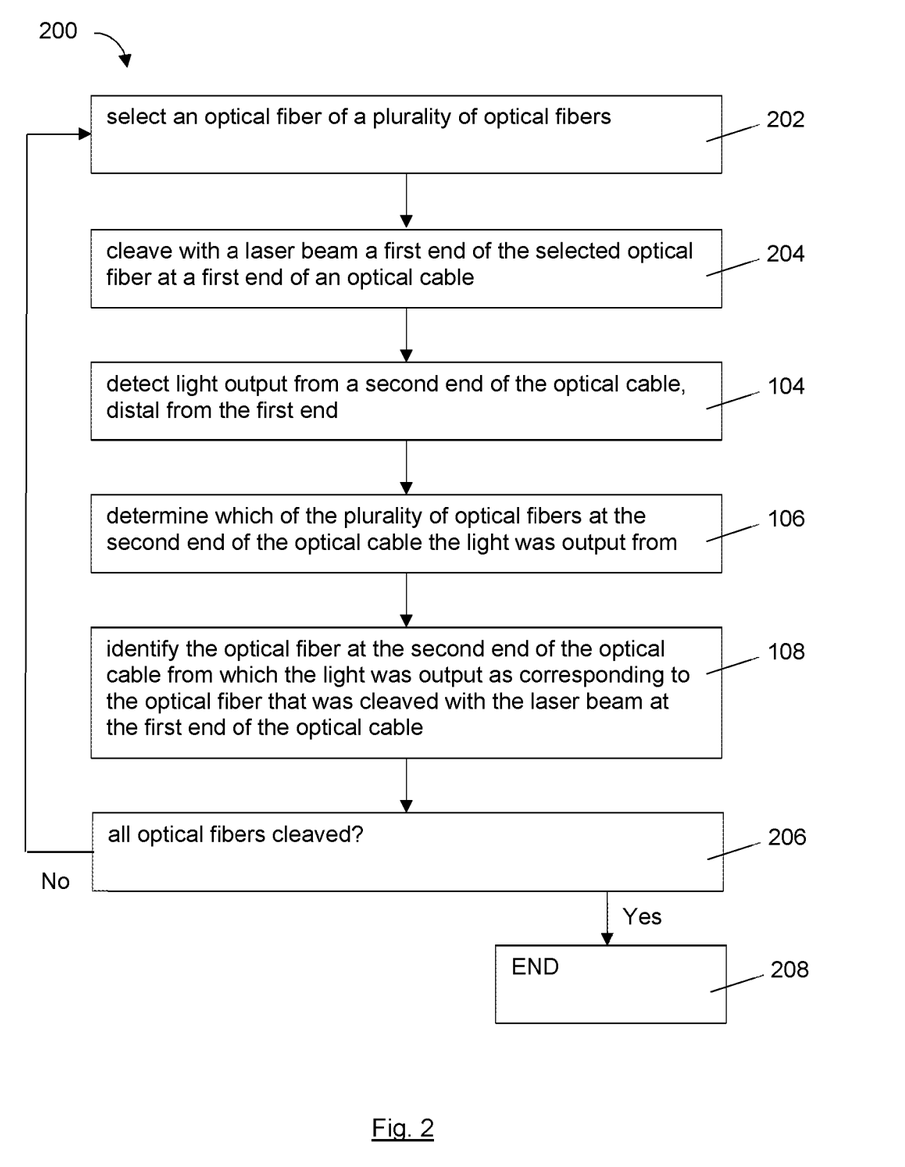

FIG. 2 illustrates an embodiment of a method 200 of configuring an optical cable comprising a plurality of optical fibers. The method 200 commences with selecting 202 one of the optical fibers of the optical cable. A first end of the selected optical fiber is then cleaved 204 at a first end of the optical cable. Said first end of the optical fiber is cleaved with a laser beam having an intensity distribution adapted and arranged to cause a burst of light to be generated during the cleaving of the optical fiber. The laser beam is adapted and arranged to cause at least some of said burst of light to be received into the optical fiber, for propagation within the optical fiber.

The method additionally comprises detecting 104 light output from a second end of the optical cable, distal from the first end. The method then comprises determining 106 which of the plurality of optical fibers at the second end of the optical cable the light was output from. The optical fiber at the second end of the optical cable from which the light was output is then identified 108 as corresponding to the optical fiber that was cleaved with the laser beam at the first end of the optical cable.

The method 200 then comprises checking 206 whether all of the optical fibers of the plurality of optical fibers have been cleaved. If so, the configuration of the optical cable is completed and the method ends 208. If not, a further one of the plurality of optical fibers is selected 202 and the steps 204, 104, 106, 108 of the method 200 are repeated, and so on, until all of the optical fibers have been cleaved.

The light output from the second end of the optical cable is at least some of said burst of light generated during the cleaving of each optical fiber at the first end of the optical cable, which has propagated within the respective optical fiber to a second end of the optical fiber at the second end of the optical cable. The method may therefore enable the corresponding optical fiber to be identified at the second, distal end of an optical cable during cleaving of each optical fiber at the first end. The method may also enable the continuity of the optical fibers within the optical cable to be checked.

Figure 3:
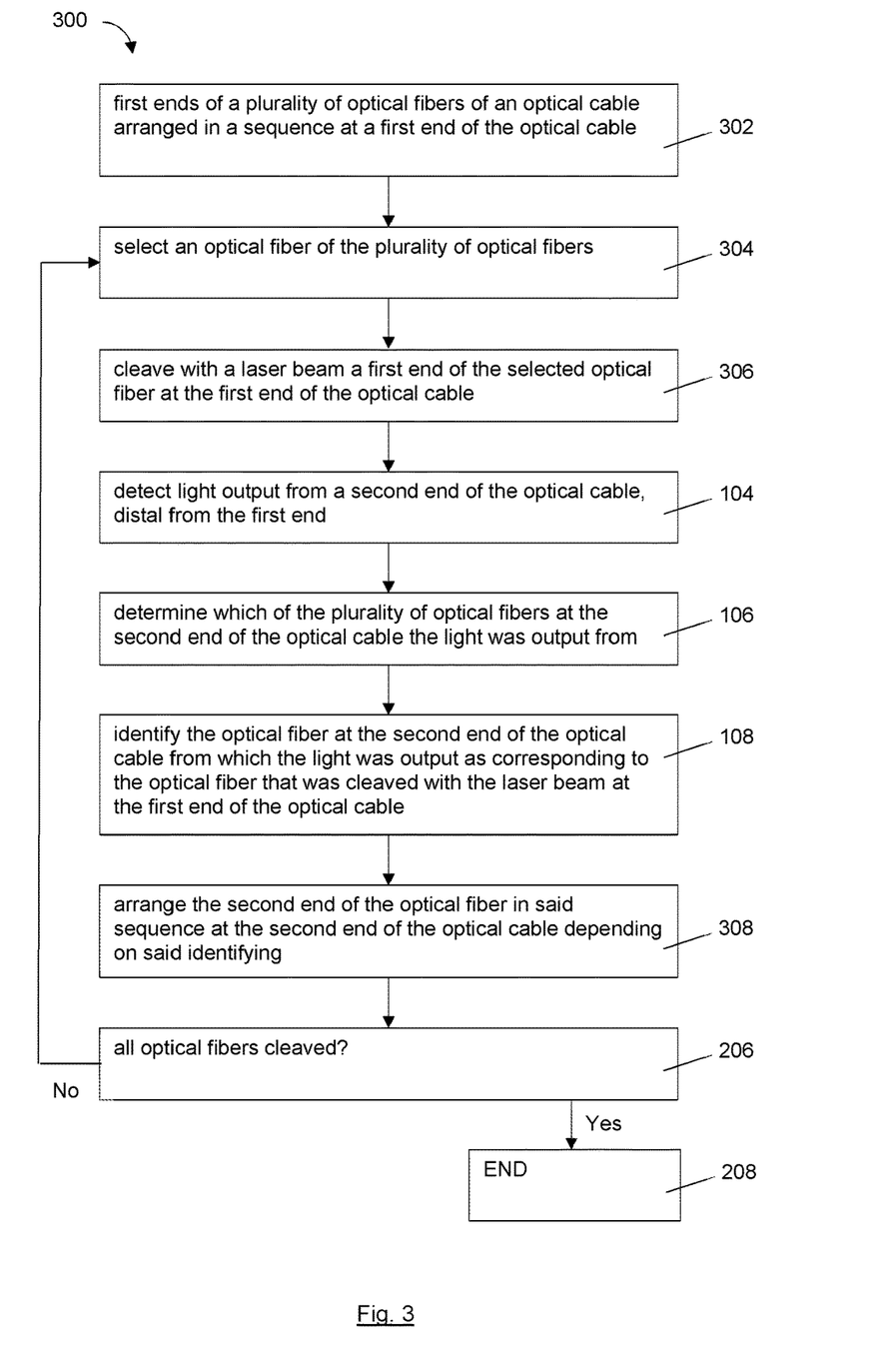

FIG. 3 illustrates an embodiment of a method 300 of configuring an optical cable comprising a plurality of optical fibers, each optical fiber having a first end and a second end.

In this embodiment, the first ends of the plurality of optical fibers are arranged 302 in a predetermined sequence at a first end of the optical cable. One of the plurality of optical fibers is selected 304 at the first end of the optical cable and the first end of the selected optical fiber is cleaved 306. Said first end of the optical fiber is cleaved with a laser beam having an intensity distribution adapted and arranged to cause a burst of light to be generated during the cleaving of the optical fiber. The laser beam is adapted and arranged to cause at least some of said burst of light to be received into the optical fiber, for propagation within the optical fiber.

The method additionally comprises detecting 104 light output from a second end of the optical cable, distal from the first end. The method comprises determining 106 which of the plurality of optical fibers at the second end of the optical cable the light was output from. The optical fiber at the second end of the optical cable from which the light was output is then identified 108 as corresponding to the optical fiber that was cleaved with the laser beam at the first end of the optical cable.

The second end of the optical fiber is arranged 308 in said predetermined sequence at the second end of the optical cable, depending on said identification. This may be done on a fiber by fiber basis, or, following identification of all of the plurality of optical fibers at the second end of the optical cable, the second ends of the optical fibers may then be arranged in said sequence. The optical fibers at second end of the optical cable may thereby be arranged in the same sequence as those at the first end of the optical cable during the process of cleaving the optical fibers at the first end of the optical cable.

The method 300 comprises checking 206 whether all of the optical fibers of the plurality of optical fibers have been cleaved. If so, the configuration of the optical cable is completed and the method ends 208. If not, a further one of the plurality of optical fibers is selected 304 and the steps 306, 104, 106, 108, 308 of the method 200 are repeated, and so on, until all of the optical fibers have been cleaved.

Figure 4:
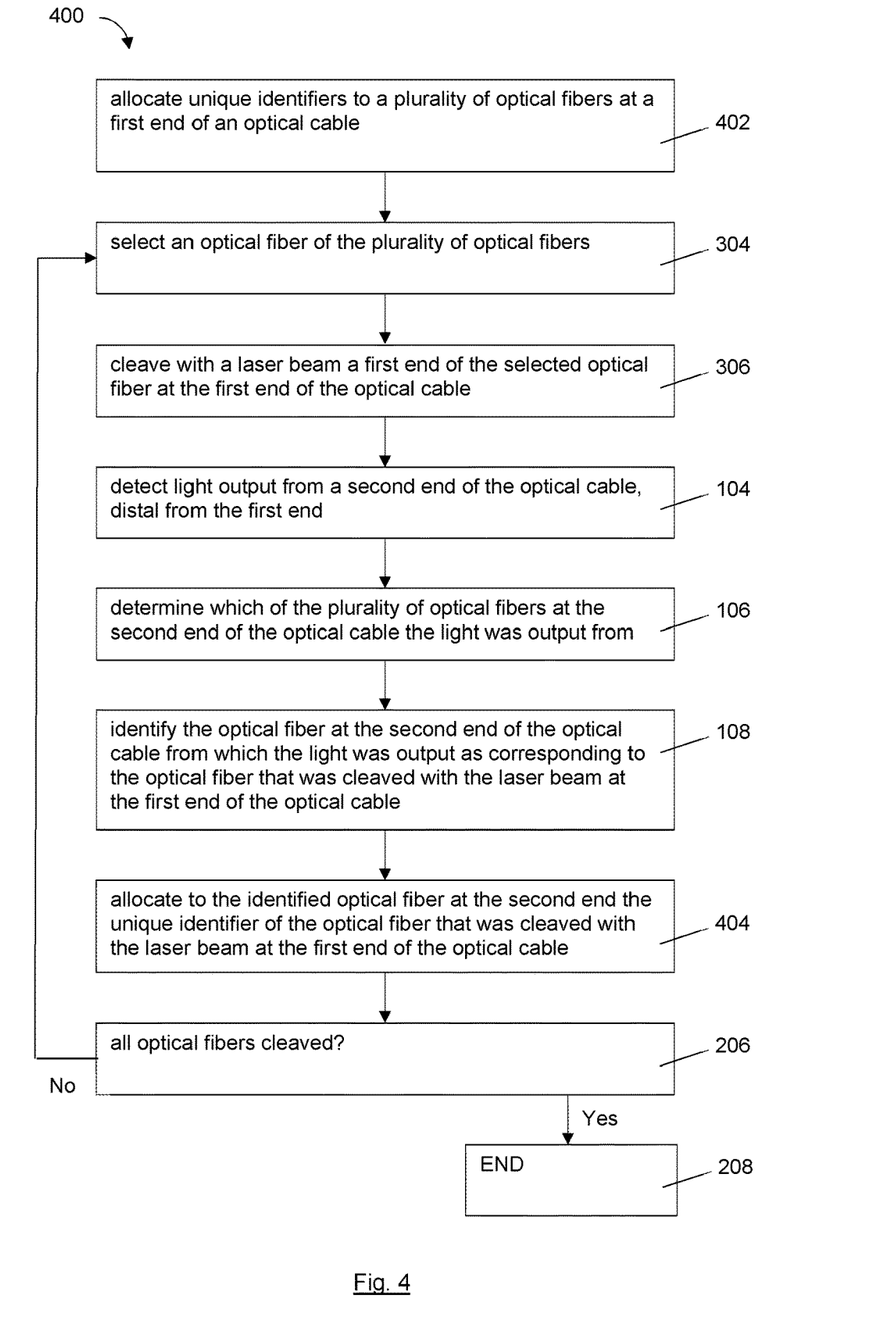

FIG. 4 illustrates an embodiment of a method 400 of configuring an optical cable comprising a plurality of optical fibers. The method 400 commences with allocating 402 unique identifiers to the plurality of optical fibers at the first end of the optical cable. One of the plurality of optical fibers is then selected 304 at the first end of the optical cable and the first end of the selected optical fiber is cleaved 306. Said first end of the optical fiber is cleaved with a laser beam having an intensity distribution adapted and arranged to cause a burst of light to be generated during the cleaving of the optical fiber. The laser beam is adapted and arranged to cause at least some of said burst of light to be received into the optical fiber, for propagation within the optical fiber.

The method additionally comprises detecting 104 light output from a second end of the optical cable, distal from the first end. The method comprises determining 106 which of the plurality of optical fibers at the second end of the optical cable the light was output from. The optical fiber at the second end of the optical cable from which the light was output is then identified 108 as corresponding to the optical fiber that was cleaved with the laser beam at the first end of the optical cable.

Following identifying 108 of the optical fiber, the method 400 comprises allocating 404 to the identified optical fiber at the second end of the optical cable the same unique identifier as allocated to the optical fiber that was cleaved with the laser beam at the first end of the optical cable.

The method 400 comprises checking 206 whether all of the optical fibers of the plurality of optical fibers have been cleaved. If so, the configuration of the optical cable is completed and the method ends 208. If not, a further one of the plurality of optical fibers is selected 304 and the steps 306, 104, 106, 108, 404 of the method 200 are repeated, and so on, until all of the optical fibers have been cleaved.

The unique identifiers may be allocated to the optical fibers by applying an indicia, such as a number or a colour, to the respective optical fiber or to a mounting apparatus, such as a ferrule or v-groove, in which the optical fiber is located.

Figure 5:
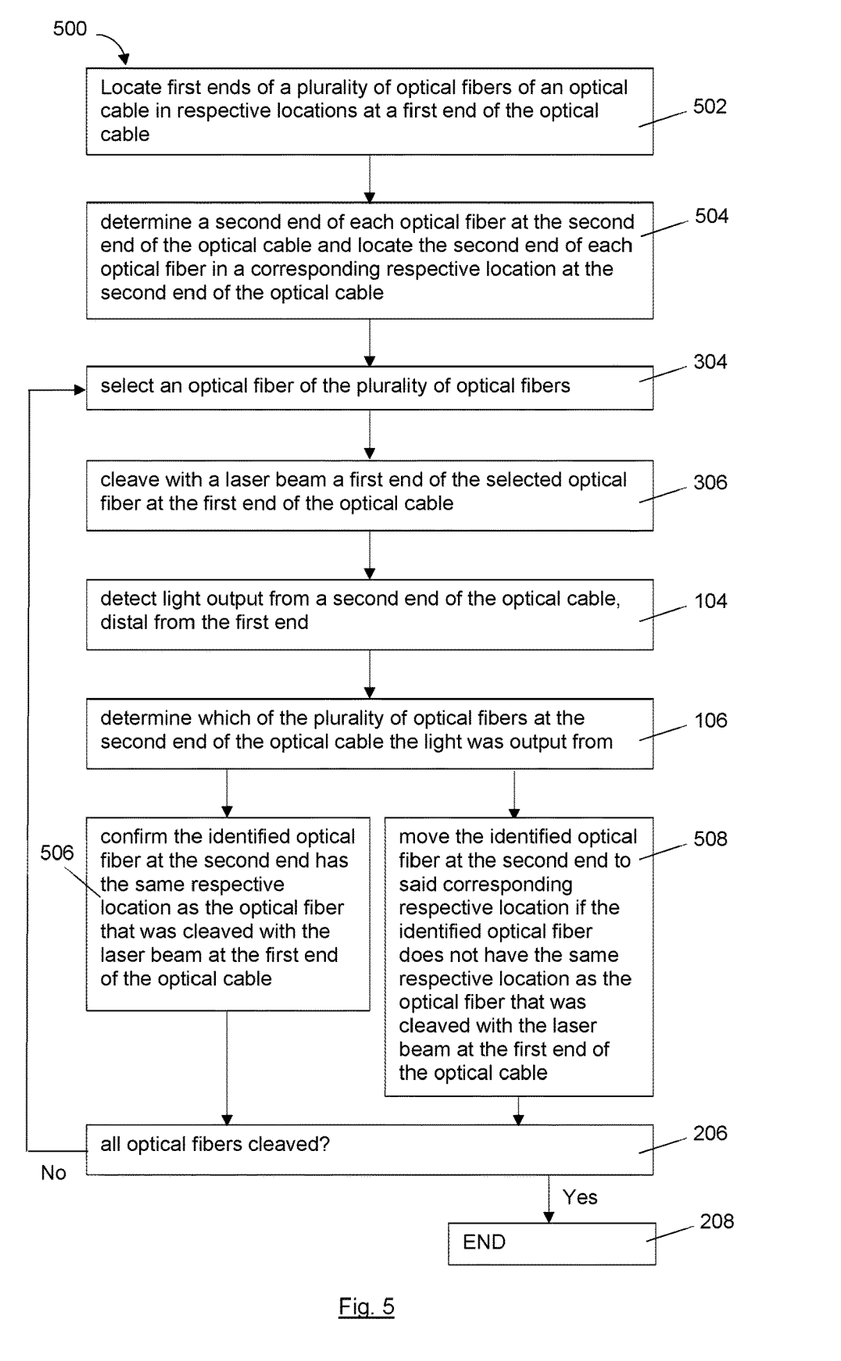

FIG. 5 illustrates an embodiment of a method 500 of configuring an optical cable comprising a plurality of optical fibers, each optical fiber having a first end and a second end. The method 500 of this embodiment commences with locating the first ends of the plurality of optical fibers in respective locations at the first end of the optical cable. A second end of each optical fiber at the second end of the optical cable is then determined 502, and the second end of each optical fiber is located in a corresponding respective location at the second end of the optical cable.

The first and second ends of the optical fibers may be located in respective first and second mounting apparatus, such as a ferrule or v-groove.

One of the plurality of optical fibers is selected 304 at the first end of the optical cable and the first end of the selected optical fiber is cleaved 306. Said first end of the optical fiber is cleaved with a laser beam having an intensity distribution adapted and arranged to cause a burst of light to be generated during the cleaving of the optical fiber. The laser beam is adapted and arranged to cause at least some of said burst of light to be received into the optical fiber, for propagation within the optical fiber.

The method additionally comprises detecting 104 light output from a second end of the optical cable, distal from the first end. The method comprises determining 106 which of the plurality of optical fibers at the second end of the optical cable the light was output from.

The method then comprises: confirming 504 that the identified optical fiber at the second end of the optical cable, from which light was output, has the same respective location as the optical fiber that was cleaved with the laser beam at the first end of the optical cable; or moving the identified optical cable to said corresponding respective location at the second end of the optical it does not currently have the same respective location as the optical fiber that was cleaved with the laser beam at the first end of the optical cable.

The method 500 comprises checking 206 whether all of the optical fibers of the plurality of optical fibers have been cleaved. If so, the configuration of the optical cable is completed and the method ends 208. If not, a further one of the plurality of optical fibers is selected 304 and the steps 306, 104, 106, 504, 506 of the method 200 are repeated, and so on, until all of the optical fibers have been cleaved.

The method 500 may thus be employed to check that the optical fibers at the second end of the optical cable are in the correct sequence, corresponding to the sequence at the first end, and any incorrectly located optical fibers can be relocated to the correct location, corresponding to the respective location of the optical fiber at the first end of the optical cable. Advantageously, the method 500 enables cleaving of the optical fibers at the first end of the cable and checking the sequence at the second end of the optical cable to be performed as a single step process.

Figure 6:
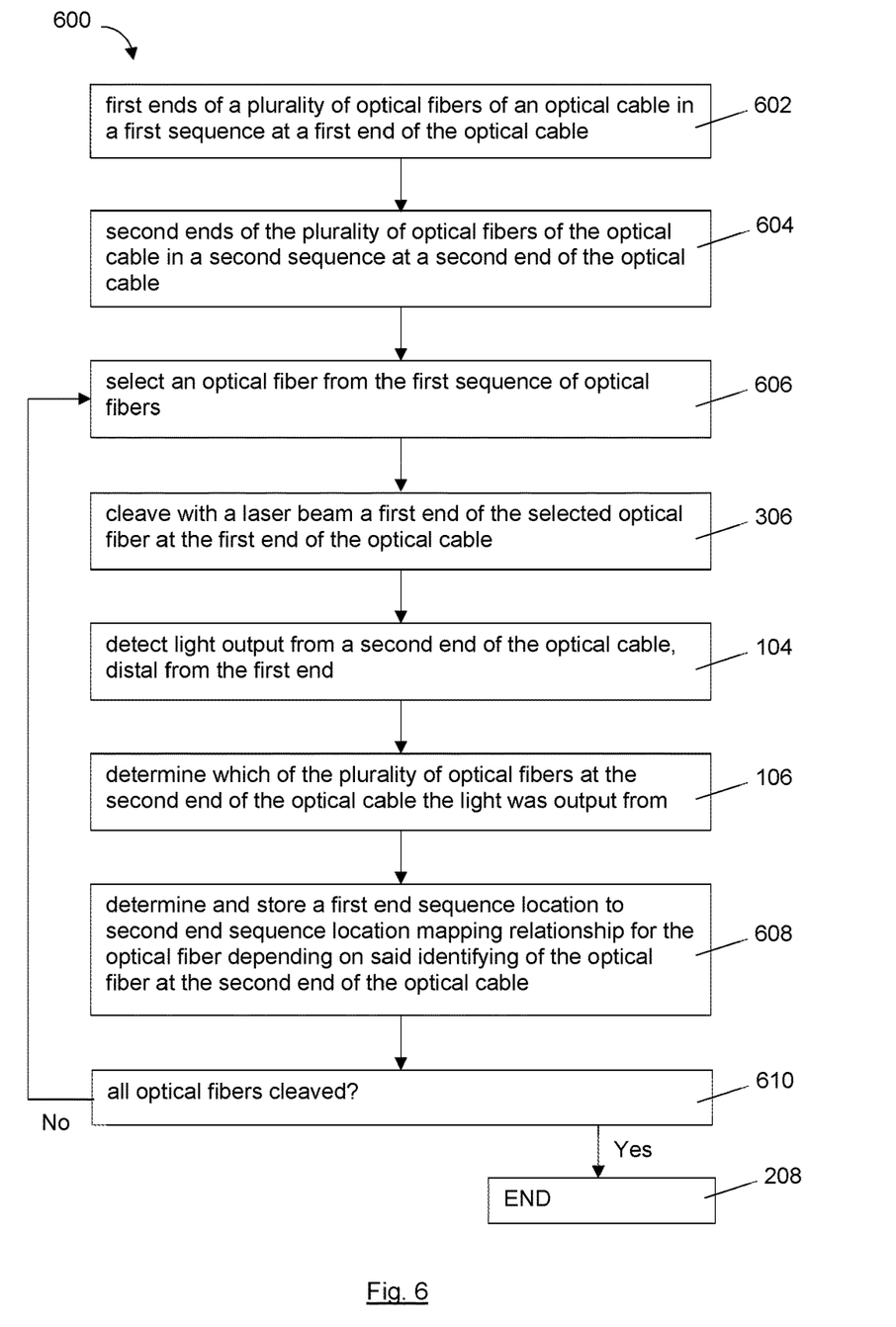

FIG. 6 illustrates an embodiment of a method 600 of configuring an optical cable comprising a plurality of optical fibers, each optical fiber having a first end and a second end.

Similarly to the method 300 of FIG. 3, the first ends of a plurality of optical fibers of the optical cable are in a first sequence at a first end of the optical cable 602. The second ends of the plurality of optical fibers of the optical cable are in a second sequence, generally different to the first sequence, at the second, distal end of the optical cable.

Both the first sequence and the second sequence will typically be an arbitrary sequence but it will be appreciated that preselected sequences may also be used.

The first ends of the optical fibers are located in a first mounting apparatus and the second ends of the optical fibers are located in a second mounting apparatus. The first and second mounting apparatus may, for example, be a plurality of ferrules or v-grooves adapted and arranged to receive the respective ends of the optical fibers.

One of the optical fibers in the first sequence is selected 606 and the first end of the selected optical fiber is cleaved 306. Said first end of the optical fiber is cleaved with a laser beam having an intensity distribution adapted and arranged to cause a burst of light to be generated during the cleaving of the optical fiber. The laser beam is adapted and arranged to cause at least some of said burst of light to be received into the optical fiber, for propagation within the optical fiber.

Light output from the second end of the optical cable is detected 104 and it is determined 106 which of the plurality of optical fibers at the second end of the optical cable the light was output from. The method 600 then comprises determining 608 a mapping relationship between the location of the first end of the optical fiber in the first sequence and the location of the second end of the optical fiber in the second sequence. For example, there may be 64 optical fibers in the optical cable with the optical fibers arranged at the first end of the optical cable in a first sequence of 64 and with the optical fibers arranged at the second end of the optical cable in a second sequence of 64. Fiber 1 of the first sequence of fibers may be selected and cleaved at the first end of the optical cable, the light at the second end of the optical cable detected, and a determination made that the light was output from fiber 23 of the second sequence of fibers. The mapping relationship is therefore: fiber 1 in the first sequence at the first end maps to fiber 23 in the second sequence at the second end. The mapping relationship is then stored 608.

The method 600 comprises checking 610 whether all of the optical fibers in the first sequence of optical fibers have been cleaved. If so, the configuration of the optical cable is completed and the method ends 208. If not, a further one of the optical fibers in the first sequence is selected 606 and the steps 306, 104, 106, 608 of the method 600 are repeated, and so on, until all of the optical fibers in the first sequence have been cleaved at the first end of the optical cable.

Figure 7:
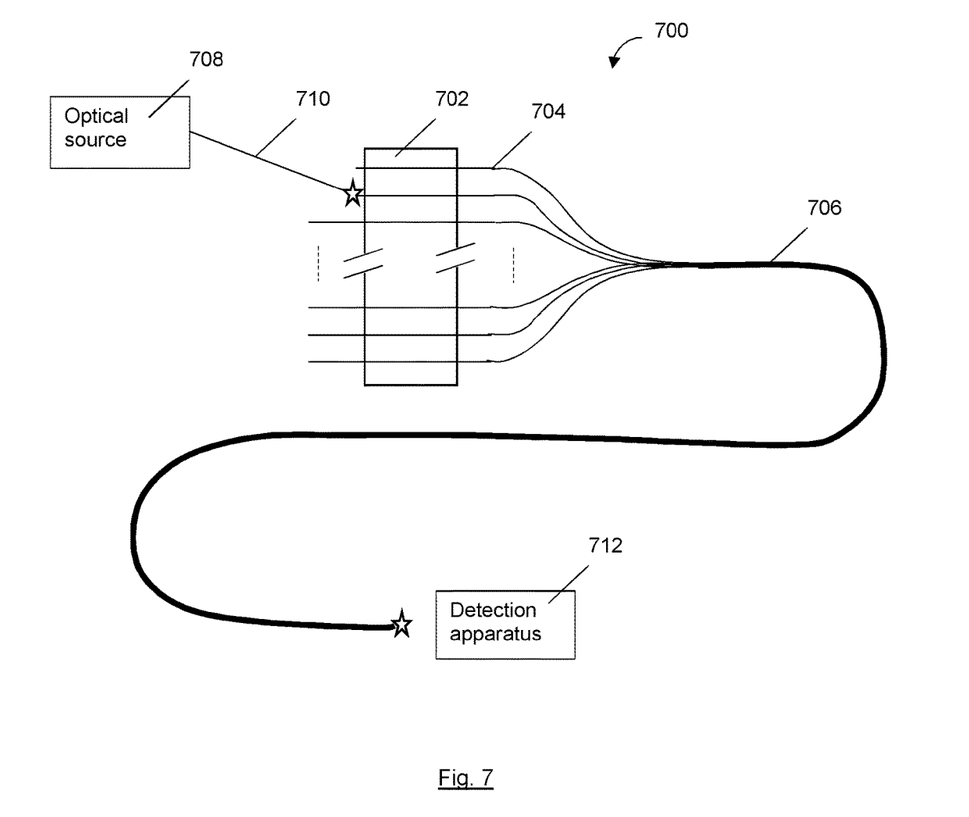
FIGS. 7 to 9 illustrate optical cable configuration apparatus according to embodiments of the invention, and include an optical cable and its plurality of optical fibers for reasons of clarity only.

FIG. 7 illustrates an optical cable configuration apparatus 700 according to an embodiment of the invention. The apparatus 700 comprises optical fiber locating apparatus 702, an optical source 708 and optical detection apparatus 712. The optical fiber locating apparatus 702 is configured to hold first ends of a plurality of optical fibers 704 of the optical cable 706 at a first end of the optical cable. The optical source is configured to generate a laser beam 710 for laser cleaving a first end of an optical fiber of the plurality of optical fibers. The laser beam has an intensity distribution adapted and arranged to cause a burst of light, illustrated as a 'star burst', to be generated during cleaving of the optical fiber. The laser beam is adapted and arranged to cause at least some of the burst of light to be received into the first end of the optical fiber, for propagation within the optical fiber. The optical detection apparatus 712 is configured to detect light output from a second end of the optical cable, distal from the first end. The optical detection apparatus 712 is also configured to determine which of the plurality of optical fibers at the second end of the optical cable the light was output from.

Figure 8:
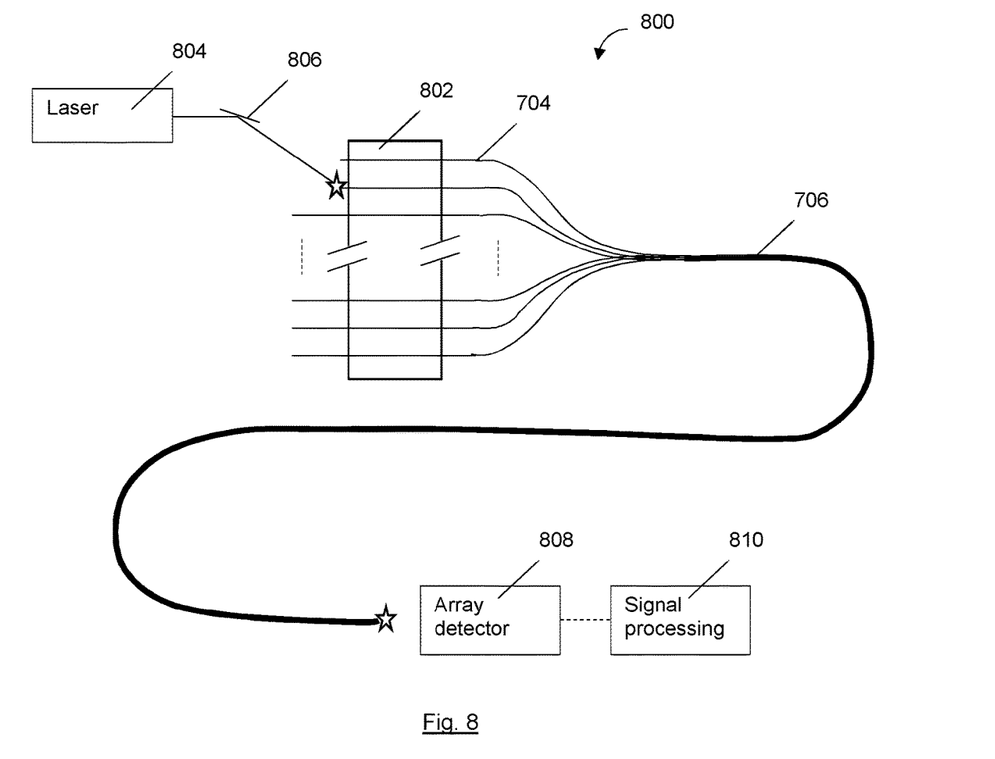

FIG. 8 illustrates an optical cable configuration apparatus 800 according to an embodiment of the invention that is similar to the apparatus 700 of FIG. 7, with the following modifications.

In this embodiment, the optical source comprises a laser 804, such as a $CO_2$ laser or a UV excimer laser, and beam steering optics, illustrated generally as 806, adapted and arranged to direct the laser beam towards a first end of an optical fiber 704 at the first end of the optical cable 706. It will be understood that in order to effect laser cleaving of the first end of the optical fiber 704, the laser beam should impinge on the optical fiber from a side, rather than being directed onto an end face of the optical fiber.

The optical fiber locating apparatus comprises a ferrule element 802 configured to hold first ends of the optical fibers 704. Alternatively, a v-groove mounting element may be used comprising a plurality of v-grooves for receiving the first ends of the optical fibers. The optical fiber locating apparatus is adapted so that the first ends of the optical fibers extend beyond the ferrule element 802, to make a section of each optical fiber available to be cleaved by the laser beam.

The optical detection apparatus comprises an optical array detector 808, for example a camera, and signal processing apparatus 810. The optical array detector is configured to detect light output from the second end of the optical cable, illustrated as a 'star burst'. The signal processing apparatus is configured to receive an output signal from the optical detector array and is configured to determine which of the plurality of optical fibers at the second end of the optical cable the light was output from.

Figure 9:
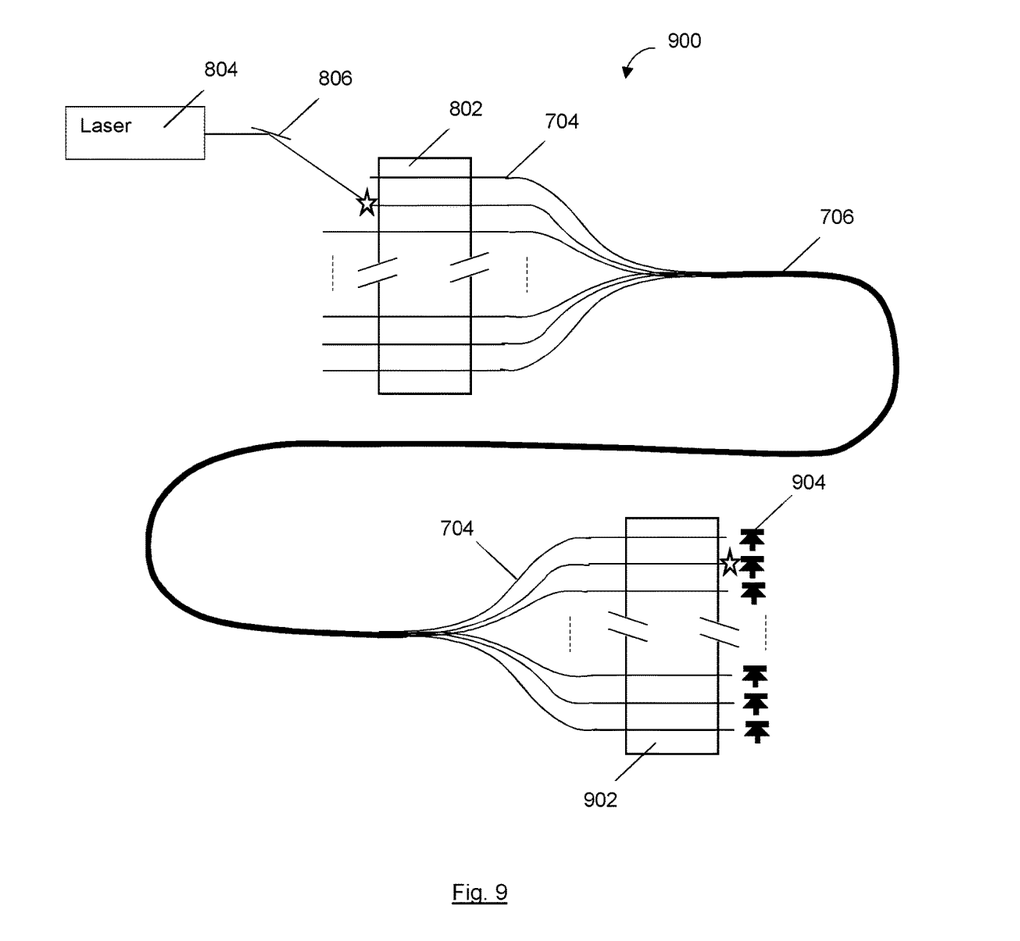

FIG. 9 illustrates an optical cable configuration apparatus 900 according to an embodiment of the invention that is similar to the apparatus 800 of FIG. 8, with the following modifications.

In this embodiment, the apparatus 800 comprises second fiber locating apparatus configured to hold second ends of the optical fibers at the second end of the optical cable. Similarly to the previous embodiment, the second fiber locating apparatus comprises a ferrule element 902 configured to hold the second ends of the optical fibers 704. Alternatively, a v-groove mounting element may be used comprising a plurality of v-grooves for receiving the second ends of the optical fibers.

The optical detection apparatus comprises a plurality of optical detectors 904, for example a photodiode or CCD array, configured to detect light output from respective optical fibers mounted in the second fiber locating apparatus.

It will be appreciated by one of ordinary skill in the art that the apparatus 700, 800, 900 illustrated in FIGS. 7 to 9 may be adapted and arranged to carry out the methods of configuring an optical cable illustrated in FIGS. 1 to 8.

It will be appreciated that the specific orientations used within these FIGURES to demonstrate the apparatus functionality are by way of example only.

The present disclosure is directed to each individual feature, apparatus and/or method described herein. In addition, any combination of two or more such features, apparatus and/or methods, if such features, apparatus and/or methods are not mutually inconsistent, is included within the scope of the present invention. To avoid undue repetition, not all features are discussed in conjunction with every aspect, embodiment or practice of the disclosure. Features described in conjunction with one aspect, embodiment or practice are deemed to be includable with others absent mutual inconsistency or a clear teaching to the contrary. In some instances, features will be discussed generally rather than in detail in conjunction with a specific aspect, embodiment or practice, and it is understood that such features can be included in any aspect, embodiment or practice, again absent mutual inconsistency or a clear teaching to the contrary.

Those of ordinary skill in the art will readily envision a variety of other means and structures for performing the functions and/or obtaining the results or advantages described herein and each of such variations or modifications is deemed to be within the scope of the present invention. More generally, those skilled in the art would readily appreciate that all parameters, dimensions, materials and configurations described herein are meant to be exemplary and that actual parameters, dimensions, materials and configurations will depend on specific applications for which the teachings of the present invention are used.

Those skilled in the art will recognize or be able to ascertain using no more than routine experimentation many equivalents to the specific embodiments of the invention described herein. It is therefore to be understood that the foregoing embodiments are presented by way of example only and that within the scope of the appended claims, and equivalents thereto, the invention may be practiced otherwise than as specifically described.

In the claims as well as in the specification above all transitional phrases such as "comprising", "including", "carrying", "having", "containing", "involving" and the like are understood to be open-ended. Only the transitional phrases "consisting of" and "consisting essentially of" shall be closed or semi-closed transitional phrases, respectively, as set forth in the U.S. Patent Office Manual of Patent Examining Procedure § 2111.03, 8th Edition, Revision 8. Furthermore, statements in the specification, such as, for example, definitions, are understood to be open ended unless otherwise explicitly limited.

The phrase "A or B" as in "one of A or B" is generally meant to express the inclusive "or" function, meaning that all three of the possibilities of A, B or both A and B are included, unless the context clearly indicates that the exclusive "or" is appropriate (i.e., A and B are mutually exclusive and cannot be present at the same time). "At least one of A, B or C" (as well as "at least one of A, B and C") reads on any combination of one or more of A, B and C, including, for example the following: A; B; C; A & B; A & C; B & C; A & B; as well as on A, B & C.

It is generally well accepted in patent law that "a" means "at least one" or "one or more." Nevertheless, there are occasionally holdings to the contrary. For clarity, as used herein "a" and the like mean "at least one" or "one or more." The phrase "at least one" may at times be explicitly used to emphasize this point. Use of the phrase "at least one" in one claim recitation is not to be taken to mean that the absence of such a term in another recitation (e.g., simply using "a") is somehow more limiting. Furthermore, later reference to the term "at least one" as in "said at least one" should not be taken to introduce additional limitations absent express recitation of such limitations. For example, recitation that an apparatus includes "at least one widget" and subsequent recitation that "said at least one widget is colored red" does not mean that the claim requires all widgets of an apparatus that has more than one widget to be red. The claim shall read on an apparatus having one or more widgets provided simply that at least one of the widgets is colored red. Similarly, the recitation that "each of a plurality" of widgets is colored red shall also not mean that all widgets of an apparatus that has more than two red widgets must be red; plurality means two or more and the limitation reads on two or more widgets being red, regardless of whether a third is included that is not red, absent more limiting explicit language (e.g., a recitation to the effect that each and every widget of a plurality of widgets is red).

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of configuring an optical cable comprising a plurality of optical fibers, the method comprising steps of:
   cleaving with a laser beam a first end an optical fiber of the plurality of optical fibers at a first end of the optical cable, the laser beam having an intensity distribution adapted and arranged to cause a burst of light to be generated during cleaving of the optical fiber and the laser beam is adapted and arranged to cause at least some of the burst of light to be received into the first end of the optical fiber, for propagation within the optical fiber;
   detecting light output from a second end of the optical cable, distal from the first end;
   determining which one of the plurality of optical fibers at the second end of the optical cable the light was output from; and
   identifying the optical fiber at the second end of the optical cable from which the light was output as corresponding to the optical fiber that was cleaved with the laser beam at the first end of the optical cable.

2. The method of claim 1, comprising performing said steps for each optical fiber of the plurality of optical fibers.

3. The method of claim 1, wherein each of the plurality of optical fibers has a first end and a second end and wherein the first ends of the plurality of optical fibers are arranged in a sequence at the first end of the optical cable, and the method further comprises arranging the second ends of the plurality of optical fibers in said sequence at the second end of the optical cable depending on said identifying of the optical fiber at the second end of the optical cable.

4. The method of claim 1, comprising allocating unique identifiers to the plurality of optical fibers at the first end of the optical cable and further comprising, following said step of identifying the optical fiber, allocating to the optical fiber at the second end of the optical cable from which the light was output the unique identifier of the optical fiber that was cleaved with the laser beam at the first end of the optical cable.

5. The method of claim 1, comprising locating the first ends of the plurality of optical fibers in respective locations at the first end of the optical cable, determining a second end of each optical fiber at the second end of the optical cable, and locating the second end of each optical fiber in a corresponding respective location at the second end of the optical cable, and further comprising, following said step of identifying the optical fiber:
confirming that the optical fiber at the second end of the optical cable from which the light was output has the same respective location as the optical fiber that was cleaved with the laser beam at the first end of the optical cable; or
moving the second end of the optical cable from which the light was output to said corresponding respective location at the second end of the optical cable if the second end of the optical fiber from which the light was output does not have the same respective location as the optical fiber that was cleaved with the laser beam at the first end of the optical cable.

6. The method of claim 1, wherein the first ends of the plurality of optical fibers are in a first sequence at the first end of the optical cable and the second ends of the plurality of optical fibers are in a second sequence at the second end of the optical cable, and wherein the method comprises determining and storing a first end sequence location to second end sequence location mapping relationship for the optical fiber depending on said identifying of the optical fiber at the second end of the optical cable.

7. An optical cable configuration apparatus comprising:
an optical fiber locating apparatus configured to hold first ends of a plurality of optical fibers of the optical cable at a first end of the optical cable;
an optical source configured to generate a laser beam for laser cleaving a first end of an optical fiber of the plurality of optical fibers, wherein the laser beam has an intensity distribution adapted and arranged to cause a burst of light to be generated during the laser cleaving of the optical fiber and the laser beam is adapted and arranged to cause at least some of the burst of light to be received into the first end of the optical fiber, for propagation within the optical fiber;
and an optical detection apparatus configured to:
detect light output from a second end of the optical cable, distal from the first end; and
determine which one of the plurality of optical fibers at the second end of the optical cable the light was output from.

8. The apparatus of claim 7, wherein the optical detection apparatus comprises:
an optical array detector configured to detect light output from the second end of the optical cable; and
signal processing apparatus configured to receive an output signal from the optical detector array and configured to determine which of the plurality of optical fibers the light was output from.

9. The apparatus of claim 7, comprising a second fiber locating apparatus configured to hold second ends of the plurality of optical fibers of the optical cable at the second end of the optical cable and wherein the optical detection apparatus comprises a plurality of optical detectors configured to detect light output from respective optical fibers of the plurality of optical fibers at the second end of the optical cable.

10. The apparatus of claim 7, wherein the optical fiber locating apparatus comprises one of a ferrule element configured to hold first ends of the optical fibers and a v-groove mounting element comprising a plurality of v-grooves for receiving the first ends of the optical fibers.

11. The apparatus of claim 7, wherein the optical detection apparatus comprises at least one of an optical array detector, a camera, a plurality of optical detectors, a photodiode array and a charge coupled device, CCD, array.

12. The apparatus of claim 7, comprising a second optical fiber locating apparatus comprising one of a ferrule element configured to hold first ends of the optical fibers and a v-groove mounting element comprising a plurality of v-grooves for receiving the first ends of the optical fibers.

* * * * *